(12) United States Patent
Zaitsev et al.

(10) Patent No.: US 11,281,523 B1
(45) Date of Patent: Mar. 22, 2022

(54) CORRUPTED DATA MANAGEMENT IN A SYSTEM OF SERVICES

(71) Applicant: Ridgeline, Inc., Incline Village, NV (US)

(72) Inventors: Timophey Zaitsev, Incline Village, NV (US); Charles Chang-Lin Yu, Incline Village, NV (US)

(73) Assignee: Ridgeline, Inc., Incline Village, NV (US)

( * ) Notice: Subject to any disclaimer, the term of this patent is extended or adjusted under 35 U.S.C. 154(b) by 17 days.

(21) Appl. No.: 17/008,115

(22) Filed: Aug. 31, 2020

(51) Int. Cl.
*G06F 11/07* (2006.01)
*G06F 16/901* (2019.01)
*G06F 11/30* (2006.01)

(52) U.S. Cl.
CPC ...... *G06F 11/0793* (2013.01); *G06F 11/0709* (2013.01); *G06F 11/0772* (2013.01); *G06F 11/3006* (2013.01); *G06F 16/9024* (2019.01)

(58) Field of Classification Search
CPC ............. G06F 11/0709; G06F 11/0772; G06F 11/0793; G06F 11/3006; G06F 16/9024
USPC .......................................................... 714/15
See application file for complete search history.

(56) References Cited

U.S. PATENT DOCUMENTS

| 10,824,749 | B2* | 11/2020 | Parker | G06F 21/6209 |
| 2004/0133539 | A1* | 7/2004 | Talagala | G06F 16/9024 |
| 2018/0300437 | A1* | 10/2018 | Thomsen | G06F 16/24573 |
| 2020/0120028 | A1* | 4/2020 | Deb | H04L 47/10 |
| 2020/0409931 | A1* | 12/2020 | Zang | G06F 11/1471 |
| 2021/0034737 | A1* | 2/2021 | Khan | G06N 3/0454 |

FOREIGN PATENT DOCUMENTS

| CN | 110390027 A | * 10/2019 | |
| WO | WO-2019110793 A1 | * 6/2019 | G06Q 10/06 |

* cited by examiner

*Primary Examiner* — Chae M Ko
(74) *Attorney, Agent, or Firm* — Van Pelt, Yi & James LLP

(57) ABSTRACT

A system for poisoned data management includes an interface and a processor. The interface is configured to receive an indication for remediation of poisoned data. The processor is configured to correct the poisoned data associated with an event in a storage location, wherein the storage location is determined based at least in part on a data graph associated with the poisoned data, and wherein the data graph is determined based at least in part on the data sourcing information of a published event associated with the poisoned data.

20 Claims, 12 Drawing Sheets

EventType: SecurityEdited

Payload:

```
{
  "asset_type_id": "test_asset_type_id",
  "current_credit_rating": [
     {
        "rating_source_name": "Moody's",
        "rating_source_id": "crerat:credit-rating-source:7Pa7M27JS5KGn27NIDIXSQ==",
        "rating_name": "BBB",
        "rating_id": "crerat:credit-rating-designation-entity:v2jgCwWFS3uhQIUxG6AU7w==",
        "rating_index": "1.00000000000000",
        "equivalent_id": "crerat:credit-rating-designation-entity:r1VUxmEOQJSIizKNgw27gw==",
        "equivalent_value": "6.00000000000000",
        "equivalent_name": "YYY",
        "date": "2020-01-01"
     }
  ],
  "equity": [
     {
        "name": "new name",
        "ticker": "new ticker",
        "cusip": "123456789",
        "isin": "abcdefghijkl",
        "issuer_id": "test_issuerid",
        "security_designation_id": "test_securityDesignationid",
        "industry_id": "test_industryId",
        "local_currency_id": "test_localCurrencyId",
        "domicile_id": "new domicil",
        "security_description": "new name",
        "effective_date": "2020-01-01",
        "notes": "new notes",
        "pricing_factor": "1.00000000000000",
        "valuation_factor": "1.00000000000000"
     }
  ],
  "last_modified_timestamp": {
        "utc_timestamp": "2020-03-23T03:38:00.950647",
        "wall_timestamp": "2020-03-23T03:38:00.950647",
        "timezone": "UTC",
        "utc_offset": "+0000"
  },
  "security_type": "equity",
  "unique_id": "secmas:security:iXldSD8oREuzGdJ20zrFNg=="
}
```

FIG. 10

1100 
Sequence Number
    - Event Type
        - Schema Type
    - Message Group
    - Data Tags
        - item 1
            - sourcing tag
            - corrupted data tag
        - item 2
            - sourcing tag
            - corrupted data tag
FIG. 11

CORRUPTED DATA MANAGEMENT IN A SYSTEM OF SERVICES

BACKGROUND OF THE INVENTION

In a service-to-service system architecture, data flows from one service to the next as it is processed by the system. In some cases, corrupted data enters the system or is mistakenly produced by a service. This then creates a problem as the corrupted data propagates within the system as it is passed among the different services.

BRIEF DESCRIPTION OF THE DRAWINGS

Various embodiments of the invention are disclosed in the following detailed description and the accompanying drawings.

FIG. 10 is a code example illustrating an embodiment of a published event.

FIG. 11 is a diagram illustrating an embodiment of metadata and source/input data of an event.

DETAILED DESCRIPTION

Figure 1:
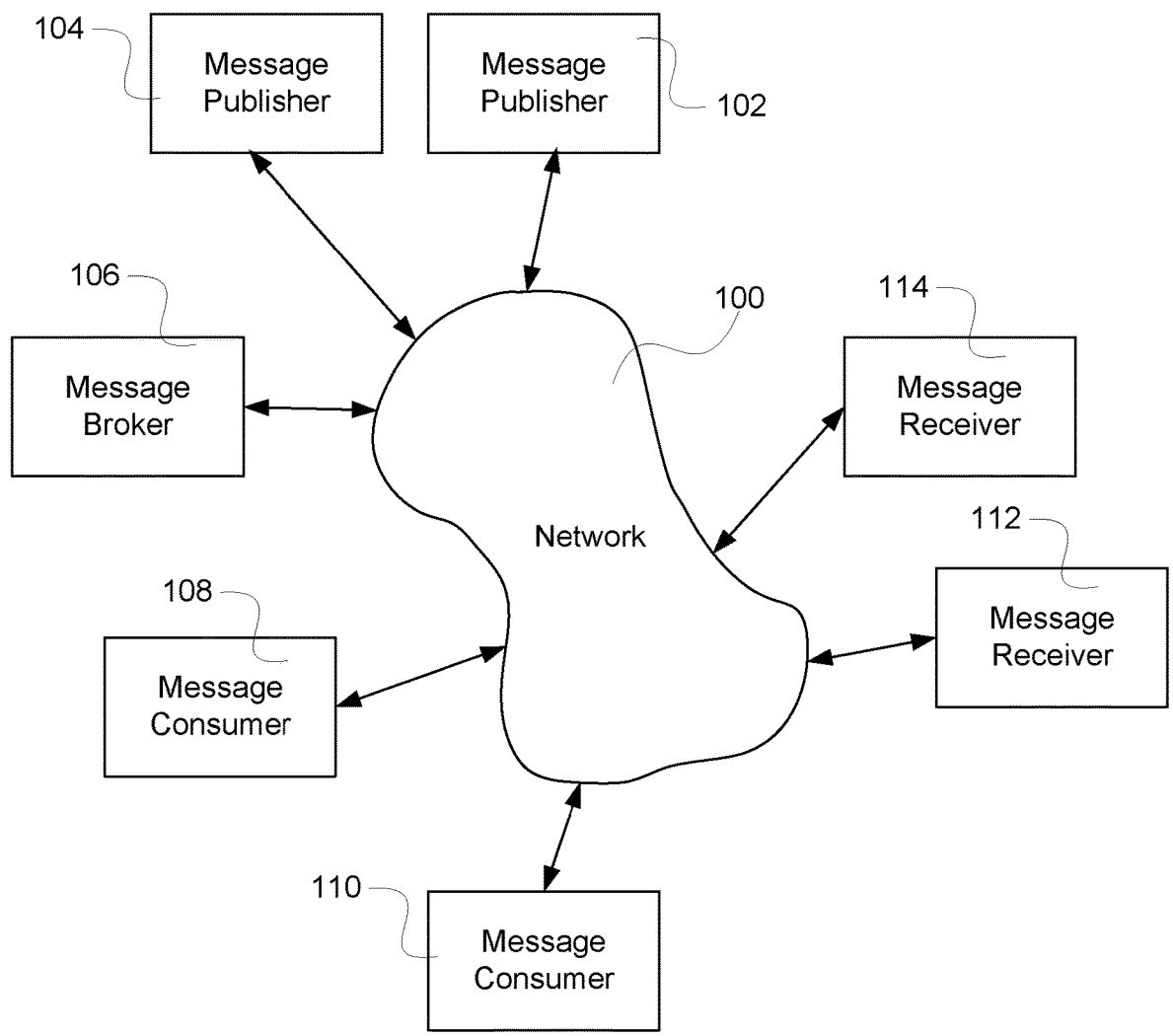
FIG. 1 is a block diagram illustrating an embodiment of a system for corrupted data management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Corrupted data management in a system of services is disclosed. The system comprises an interface and a processor. The interface is configured to receive an indication for remediation of poisoned data. The processor is configured to correct the poisoned data associated with an event in a storage location. The storage location is determined based at least in part on a data graph associated with the poisoned data. The data graph is determined based at least in part on the data sourcing information of a published event associated with the poisoned data.

The system's service-to-service messaging architecture supports a decoupled system design and allows system services to react to changes in an eventually consistent way: When an event is emitted by an upstream service, all of the downstream services registered to consume that event should be notified of the event so they can process, as soon as possible, any relevant updates. In addition, the system is designed to always retain events and all records associated with the events. The system retires failed deliveries without impacting the order of the delivery of events (i.e., no message is delivered out of order). The system is able to have a new service subscribe to events starting from the beginning or from any other point in time. The system's service-to-service messaging infrastructure is scalable, trusted, reliable (e.g., events are handled in-order), configurable, and fast.

In some embodiments, the system's service-to-service messaging architecture includes two core components: a message broker and a message consumer. The message broker is responsible for ingesting events and guaranteeing reliable and efficient storage of events in order. The message consumer is responsible for guaranteeing reliable and efficient retrieval and delivery of events in order.

In some embodiments, the system's service-to-service messaging architecture includes one message broker and N message consumers. The message broker broadcasts and stores events. The message broker exposes a programmatic interface that other services can publish messages to. All published messages are tagged with a message group identifier, where the message group identifier is for a body of related messages that must be delivered in order. Once received by the message broker, the message is assigned a sequence number for ordering within the message group, and the message and the sequence number are stored. The message consumers deliver the events to downstream services. The message consumers filter the message broker and track delivery semantics for the downstream services. Each message consumer is configured to deliver a specified set of message groups from the message broker to a target service. The message consumer guarantees the delivery and the successful processing of messages within a message group in order and maintains this guarantee by continually retrying a message until the target downstream service acknowledges that it has received and processed the event successfully. Message delivery within a message group is performed in order and later messages are held to ensure that the messages are delivered in order. Message delivery across message groups is independent so the delivery of messages in one message group is not impeded by failures to deliver messages in another.

In some embodiments, from creation of an event, each time a piece of data is consumed by any service, a record is added to a graph for this event. If new events are emitted as a result of receiving this event, they are attached to the graph with the origin being the originally created event.

In some embodiments, these graph relationships do not consume significant overhead and can be maintained by the message broker or another dedicated system depending on how quickly an answer and graph of poisoned data should need to be retrieved—Durability should almost always take precedence over speed as the poisoned data should be reversed as safely as possible.

In some embodiments, a service of the system which makes a calculation, inference, or derivation may emit data out in the form of an event, and subsequent systems may consume that data for local processing and/or immediately react to the receipt of the event to update their own systems. Both of the emmission and consumption of the data are tracked using the graphs associated with the event.

In some embodiments, should data be emitted as a result of a corrupted calculation, inference, or derivation, any downstream system would become poisoned should it act on this data. The mechanism for the forensic analysis of corruption would start with remediation of the bad calculation, inference, or derivation that emitted the poisonous events. Once remediated and spreading of the poison has been stopped, a downstream analysis would occur, marking all data poisoned across all generations of emitted events and any data modified/calculations/inferences/derivations performed as a result of this event until the propagation stops (either by error or by a leaf/terminated node). This may in some cases be system wide and pervasive.

In some embodiments, the poison/spread is minimal, and a rollback to the corrupted event may be sufficient, once events are amended rolling forward may occur with an amendment to the event allowing for each downstream unit to make corrective decisions based on the original event and the amendment.

In some embodiments, the poison/spread is pervasive, and a full rollback across multiple systems may become required. Rollback to the point of the poison potentially causing significant outage and downtime. This is almost always favorable to an invalid dataset. Events can be rolled forward again with corrections based on the inserted amendments to the corrupted tree of events.

Corrupted data management makes the computer better as the system improves data integrity and prevents bad data from propagating in the system without any way to correct for its contamination of the system. The system provides for efficient tracking of data sourcing and a manner of correcting corrupted data once the source of the corrupted data has been identified to the system. This saves time and processing in that without this system, in some cases, many computations must be redone by backing up and restoring the system to a known point when there was no contamination of the data and rolling all activities of the processor again from that time.

FIG. 1 is a block diagram illustrating an embodiment of a system for corrupted data management. In the example shown, an event or message is received from a publisher (e.g., message publisher 104 or message publisher 102) at message broker 106. The message is consumed or processed for delivery by one of a plurality of message consumers (e.g., message consumer 108 or message consumer 110) and delivered to a message receiver (e.g., message receiver 114 or message receiver 112) as indicated by the message group that a given receiver subscribes to and/or message group and/or the URL associated with the message as received from the publisher. In some embodiments, message consumer 110 is configured to message broker 106. Message publishers (e.g., message publisher 104 or message publisher 102), message broker 106, message consumers (e.g., message consumer 108 or message consumer 110), and message receivers (e.g., message receiver 112 or message receiver 114) communicate via network 100.

An event, or message, is a packet of application-specific data. In various embodiments, the event is composed of two components: metadata about the packet and a payload of application data to store. In some embodiments, metadata comprises an event type, a message group, or any other appropriate metadata. In some embodiments, the payload comprises a data payload (e.g., a payload described using JavaScript object notation (JSON)). The message describes an immutable record of information to be stored. Services may subscribe to the message and react to the contents of the message. However, not all messages are ingested or processed by a given service even if the service subscribes to the message group associated with the message.

In some embodiments, when published, the message tuple is associated with a message group that defines the logical grouping of the event type that must be processed in order. In some embodiments, the message group is not defined and it is set to the same as the event type.

In some embodiments, the payload has no required structure. In some embodiments, the payload adheres to a contractual schema defined by the service creating the message. In some embodiments, the event type is associated with a specific schema for the payload and/or the metadata associated with the message. In various embodiments, an event type comprises SecurityEdited, JournalLineEntry, or any other appropriate event type.

In some embodiments, the system that manages poisoned or corrupted data includes an interface configured to receive an indication for remediation of poisoned data. For example, an interface of a message broker receives an indication to locate and correct poisoned or corrupted data. The system further includes a processor configured to correct the poisoned data associated with an event in a storage location. For example, the message broker's processor is configured to correct the poisoned data as indicated. In some embodiments, the processor for correcting poisoned data does not belong to the message broker—the message broker only exposes an interface to receive an indication to locate poison/corrupted data, but it is not responsible for facilitating the actual correction. The poisoned data is located based at least in part on the indication received. The storage location is also based at least in part on a data graph associated with the poisoned data. The data graph is determined based at least in part on the data sourcing information of a published event associated with the poisoned data. For example, the published events are received at the message broker with sourcing information for some data. A data graph is constructed and stored by the message broker indicating which data is affected by which data. When an indication is received that a specific piece of data is poisoned, the message broker uses the data graph to determine all data that are derived from the poisoned data. The indication can be further used for correcting the poisoned data. For example, an indicated corrected data can be substituted for the poisoned data and then propagated to the other data elements that are affected by that newly corrected data as traced through the data graph.

Figure 2:
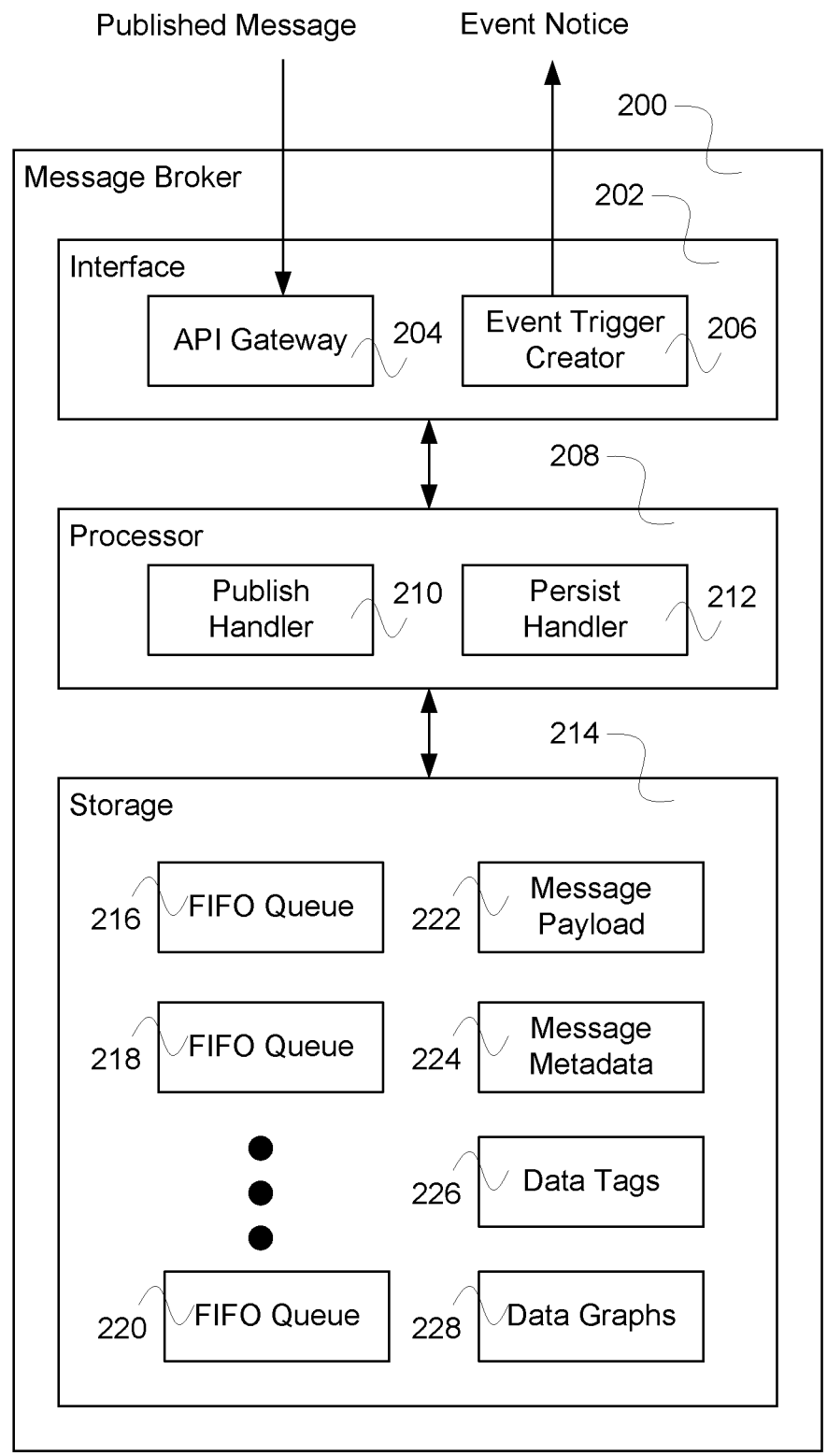
FIG. 2 is a block diagram illustrating an embodiment of a message broker.

FIG. 2 is a block diagram illustrating an embodiment of a message broker. In some embodiments, message broker 200 of FIG. 2 is used to implement message broker 106 of FIG. 1. In the example shown, message broker 200 is a centralized message store service responsible for ingesting events and guaranteeing reliable and efficient storage of events in order. In some embodiments, there is only one message broker 200 in the system environment. A message publisher provides a request (e.g., an hypertext transfer protocol (HTTP) request) to publish an event to a known URL and/or message group exposed by application peripheral interface (API) gateway 204 of interface 202. On receiving the request, publish handler 210 as executed using processor 208 extracts the event from the request and uploads the payload of the event to be stored in message payload 222 of storage 214. In some embodiments, publish handler 210 comprises a publish handler lambda. In some embodiments, message payload 222 comprises an S3 bucket for persisting message payloads. Publish handler 210 further sends metadata of the event to one of a plurality of queues (e.g., simple queue service first-in first-out (FIFO) Queue 216, FIFO Queue 218, FIFO Queue 220, etc.) so that it can be persisted in message metadata 224 of storage 214. In some embodiments, an SQS FIFO of Amazon Web Services (AWS) is used to implement FIFO Queue 216, FIFO Queue 218, and/or FIFO Queue 220. In response to the event being successfully stored, an acknowledgement is provided to the message publisher of successful receipt and processing by message broker 200. In response to the event not being successfully stored, a failure message is provided to the message publisher. The message publisher can retry by requesting again to publish the event or continue on without requesting again to publish the event.

The metadata of the event being placed in the queue of the plurality of queues triggers persist handler 212 (e.g., a persist handler lambda). Persist handler 212 is responsible for looking up the latest sequence number for the event's message group, assigning the next sequence number (e.g., one greater that the latest sequence number), and writing the metadata and the assigned sequence number to message metadata 224 of storage 214. A message consumer on being triggered by an event trigger is able to look up the metadata in message metadata 224 (e.g., a DynamoDB table for tracking message metadata). Event trigger creator 206 of interface 202 creates an event notice that can trigger a message consumer to process an event or message.

The request further includes sourcing information for any data that is part of the event or message. This sourcing information is used to determine a data graph that is stored for each piece of data in data graphs 228. Data tags are also stored associated with data received from events in data tags 226 of storage 214. In various embodiments, data tags 226 comprise a poisoned data tag, a corrected data tag, or any other appropriate data tag attached to a piece of data.

Figure 3:
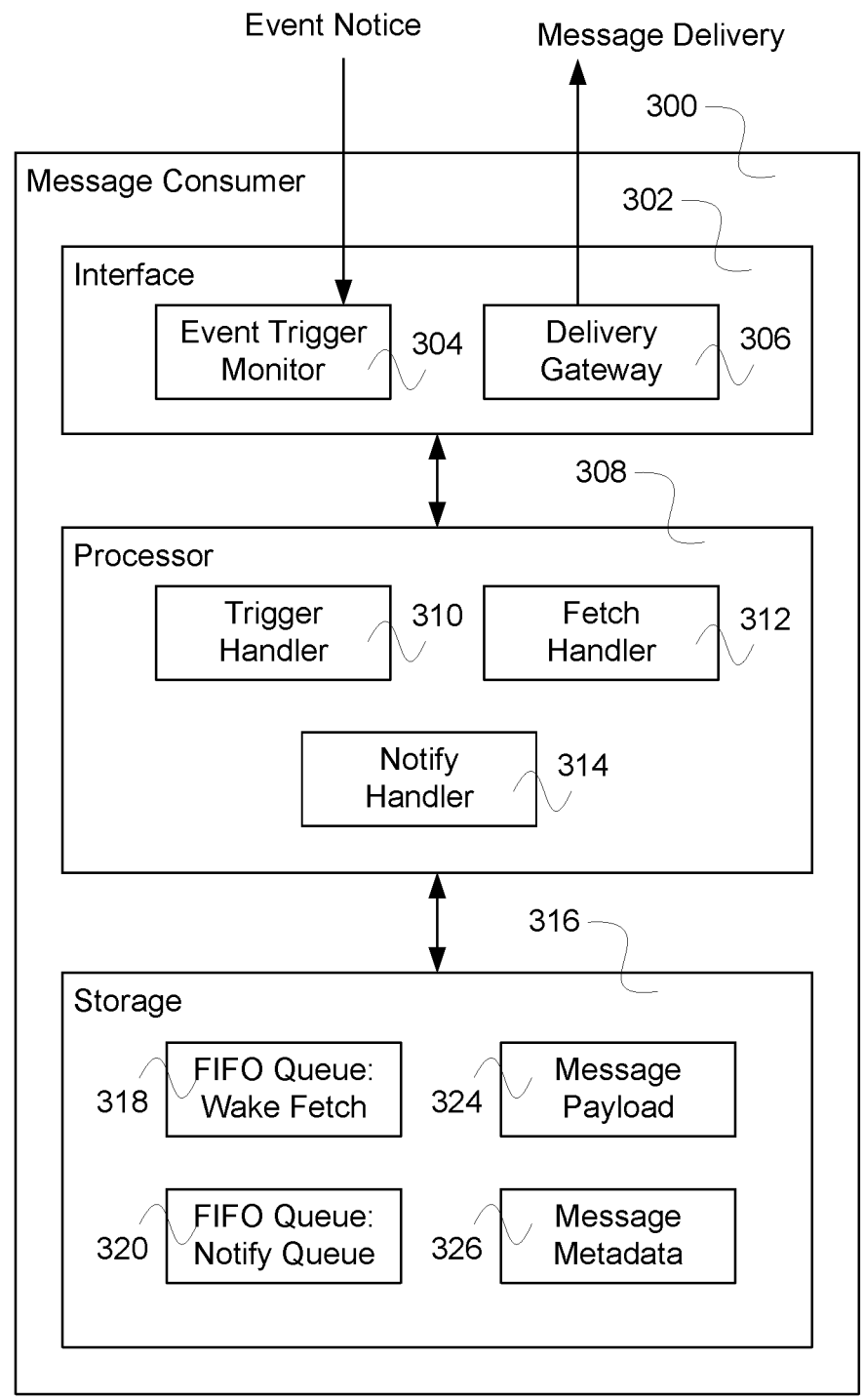
FIG. 3 is a block diagram illustrating an embodiment of a message consumer.

FIG. 3 is a block diagram illustrating an embodiment of a message consumer. In some embodiments, message consumer 300 of FIG. 3 is used to implement message consumer 108 and/or message consumer 110 of FIG. 1. In the example shown, message consumer 300 is a service that guarantees reliable and efficient retrieval and delivery of events in order from the message broker. Message consumer 300 is configured with a list of message groups to subscribe to and one or more URL's to deliver messages to (e.g., one URL for each message group, a set of URL's for each message group, etc.). Event trigger monitor 304 of interface 302 monitors event notices (e.g., a web service event) provided by the message broker and provides the event notice to trigger handler 310 (e.g., a trigger handler lambda). Trigger handler 310 queues the event notices in FIFO queue: wake fetch 318. Fetch handler 312 (e.g., a fetch handler lambda) pulls the event notices from FIFO queue: wake fetch 318. For each message group, FIFO queue: wake fetch 318 fetches a copy of the metadata and payload data for message and stores them in message metadata 326 and message payload 324 of storage 316. Once the metadata and payload data are stored, the message is queued in a notify queue for each of the message groups to deliver the event (e.g., FIFO Queue: notify queue 320).

For each message in each message group, a notify queue attempts to deliver the message. The notify queue first checks against stored information (e.g., in message metadata 326—for example, a DynamoDB table and/or message payload 324) to ensure that the message has not already been delivered and that all preceding messages have been delivered. The notify queue reconstitutes the message using the stored metadata and payload data and attempts to deliver the message to a target URL (e.g., using notify handler 314—a notify handler lambda). If the message fails to deliver, the notify queue task is retried until successful (e.g., until a success message is received from the target URL).

Figure 4:
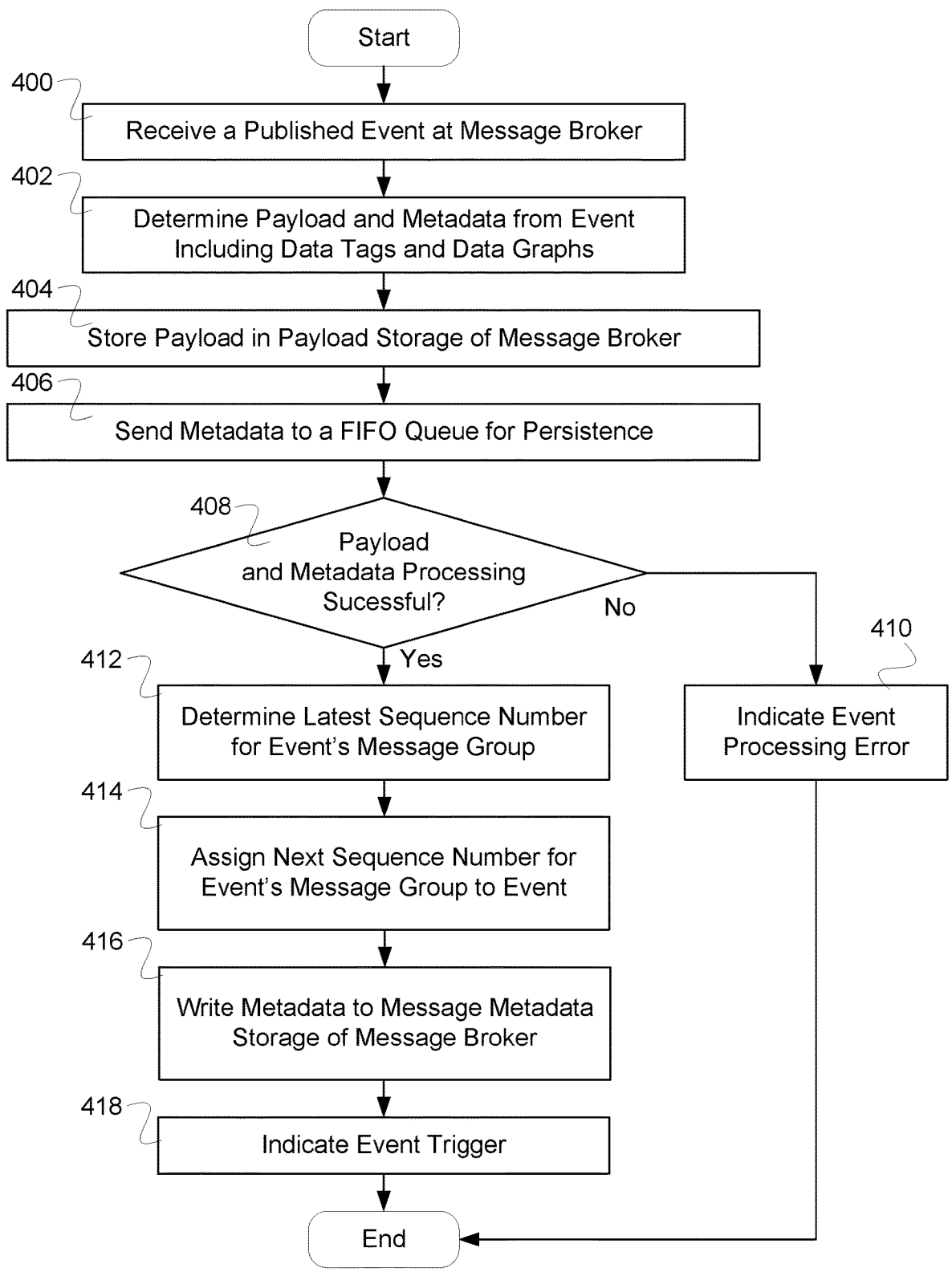
FIG. 4 is a flow diagram illustrating an embodiment of a process for corrupted data management.

FIG. 4 is a flow diagram illustrating an embodiment of a process for corrupted data management. In some embodiments, the process of FIG. 4 is executed using processor 208 of FIG. 2. In the example shown, in 400 a published event is received at a message broker. For example, a message publisher contacts a message broker to publish an event or message. In 402, payload and metadata are determined from the event including data tags and data graphs. For example, the payload and metadata are extracted from the published event from a message publisher and sourcing tags and data graphs are generated. In some embodiments, the tags include corrupted data tags. In some embodiments, the data graphs are generated using sourcing information received with a publishing request—the data sourcing information enables creating and or maintaining of the graph. In 404, the payload is stored in payload storage of the message broker. For example, the extracted payload from the message is stored in a local payload database of the message broker. In 406, metadata is sent to a FIFO queue for persistence. For example, the metadata extracted from the event is queued to be persisted in a local storage device. In 408, it is determined whether the payload and metadata processing is successful. For example, it is determined whether the payload and metadata were successfully stored in message broker storage. In response to the payload and metadata processing not being successful, in 410 an event processing error is indicated, and the process ends. In response to the payload and metadata processing being successful, in 412 a latest sequence number for the event's message group is determined. For example, a message group sequence number for the event is determined so that each message associated with a message group is delivered in order. In 414, a next sequence number for the event's message group is assigned to the event. For example, the event is assigned a sequence number that is one greater than the determined sequence number of the last message in the message group. In 416, the metadata is written to message metadata storage of the message broker. For example, the metadata is stored to a database along with the associated sequence number. In 418, an event trigger is indicated. For example, the message broker indicates that a message has been successfully processed and stored. In some embodiments, the indication comprises an acknowledgement to the publisher that the message was successfully processed and stored. In some embodiments, the indication comprises an indication that a new message is ready for delivery and a message should queue up the newly stored message for delivery.

Figure 5:
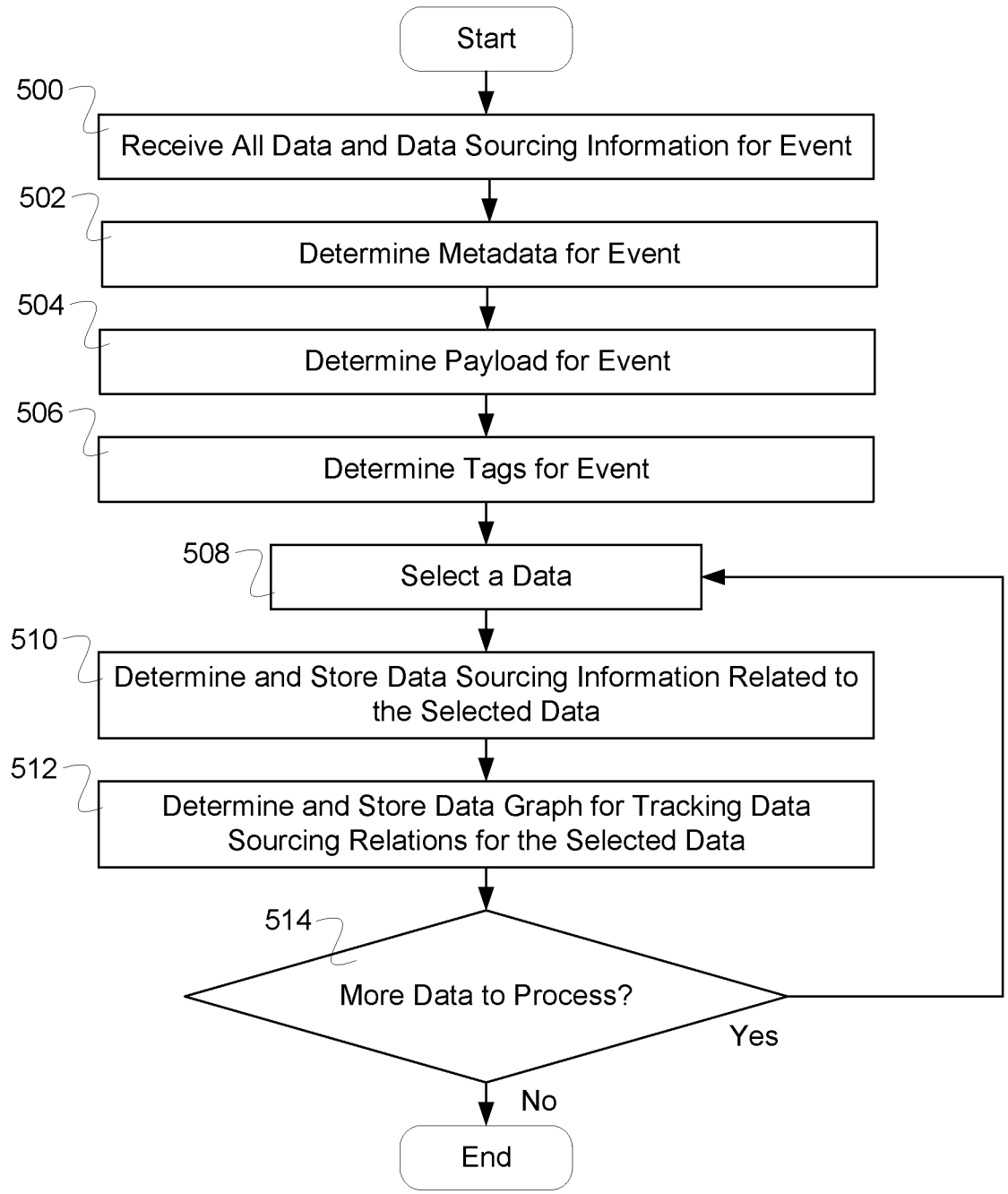
FIG. 5 is a flow diagram illustrating an embodiment of a process for determining payload and metadata from an event including data tags and data graphs.

FIG. 5 is a flow diagram illustrating an embodiment of a process for determining payload and metadata from an event including data tags and data graphs. In some embodiments, the process of FIG. 5 is used to implement 402 of FIG. 4. In the example shown, in 500 all data and data sourcing information are received for the event. For example, for a published event or message the data and sourcing information are received. In 502, metadata is determined for the event. For example, the received data is parsed to identify metadata for the event. In 504, a payload is determined for the event. For example, the received data is parsed to identify payload data for the event. In 506, tags are identified for the event. For example, the received data is parsed to identify tags for the event. In 508, a data is selected. For example, a piece of data is selected for processing. In 510, data sourcing information is determined and stored related to the selected data. For example, the event data is parsed to extract the sourcing data for the selected data. In 512, a data graph is determined and stored for tracking data sourcing relations for the selected data. For example, a data graph is created or added to based at least in part on the sourcing data for the selected data. In 514, it is determined whether there is more data to process. For example, it is determined whether there is remaining data associated with the event for which the system still needs to construct or add to a data graph showing the relations between data (e.g., what data values are used to determine other data values and where data values are stored and propagated to). In response to determining that there is more data to process, control passes to 508. In response to determining that there is not more data to process, the process ends.

Figure 6:
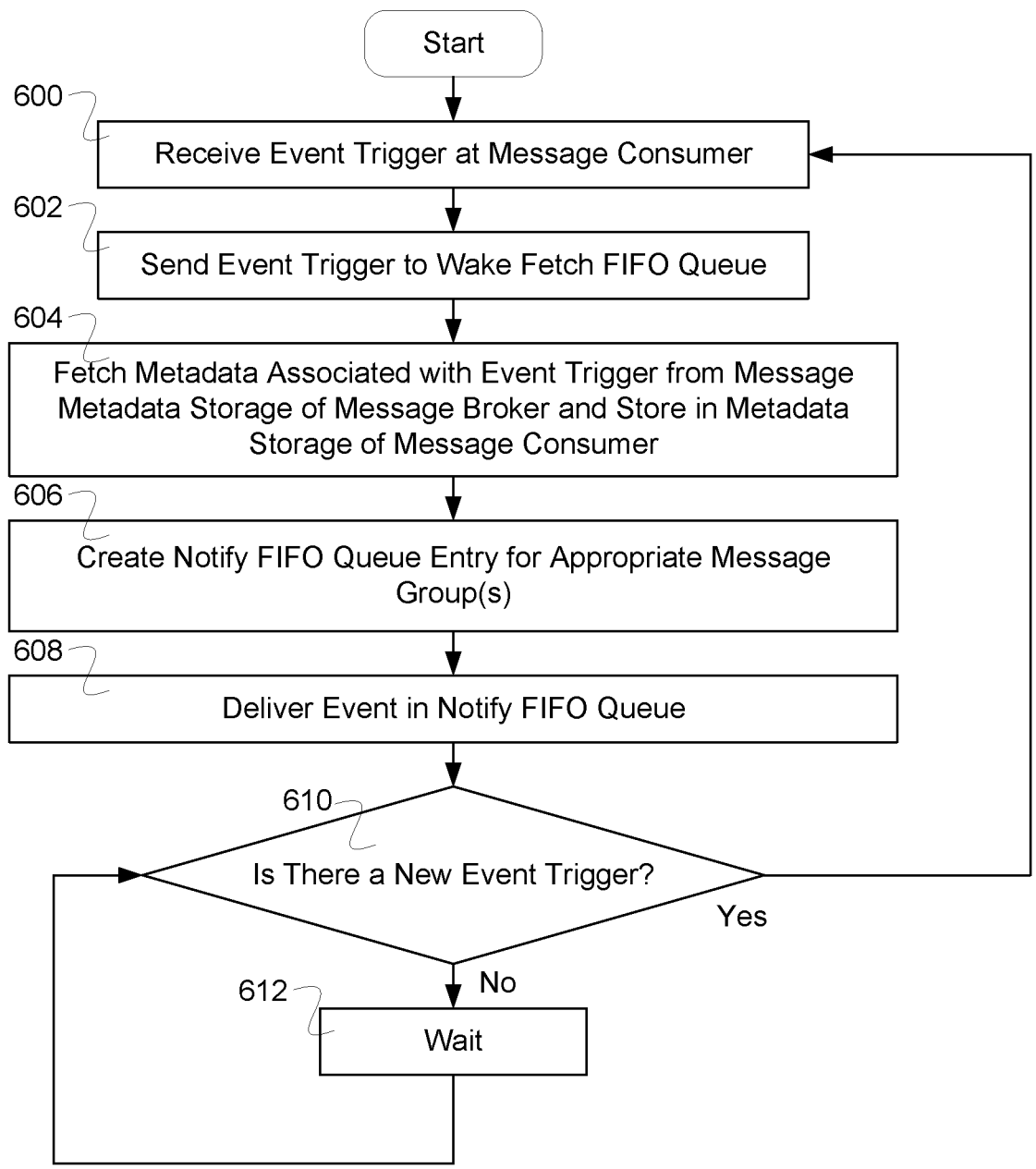
FIG. 6 is a flow diagram illustrating an embodiment of a process for corrupted data management.

FIG. 6 is a flow diagram illustrating an embodiment of a process for corrupted data management. In some embodiments, the process of FIG. 6 is executed using processor 308 of FIG. 3. In the example shown, in 600 an event trigger is received at a message consumer. For example, a message broker has properly processed a received published event and indicated that a message is ready by indicating an event trigger. In 602, event trigger is sent to wake fetch FIFO queue. For example, on receiving the event trigger is sent to an internal queue to fetch data associated with the event. In 604, metadata associated with event trigger is fetched from message metadata storage of message broker and stored in metadata storage of message consumer. For example, for each of the received event triggers the message consumer fetches the metadata associated with the event from the message broker. In 606, an entry in a notify FIFO queue for appropriate message group(s) is created. For example, the event is queued for delivery in a queue of message group(s) associated with the event. In 608, the event in the notify FIFO queue is delivered. For example, the event is delivered in the order as entered in the queue (e.g., first in first out) associated with a specific message group, and the queue also waits to deliver any later queue entry until a prior entry has been delivered. In 610, it is determined whether there is a new event trigger. For example, it is determined whether another event trigger has been received for processing. In response to there being a new event trigger, control passes to 600. In response to there not being a new event trigger, in 612 the process waits and control passes to 610.

Figure 7:
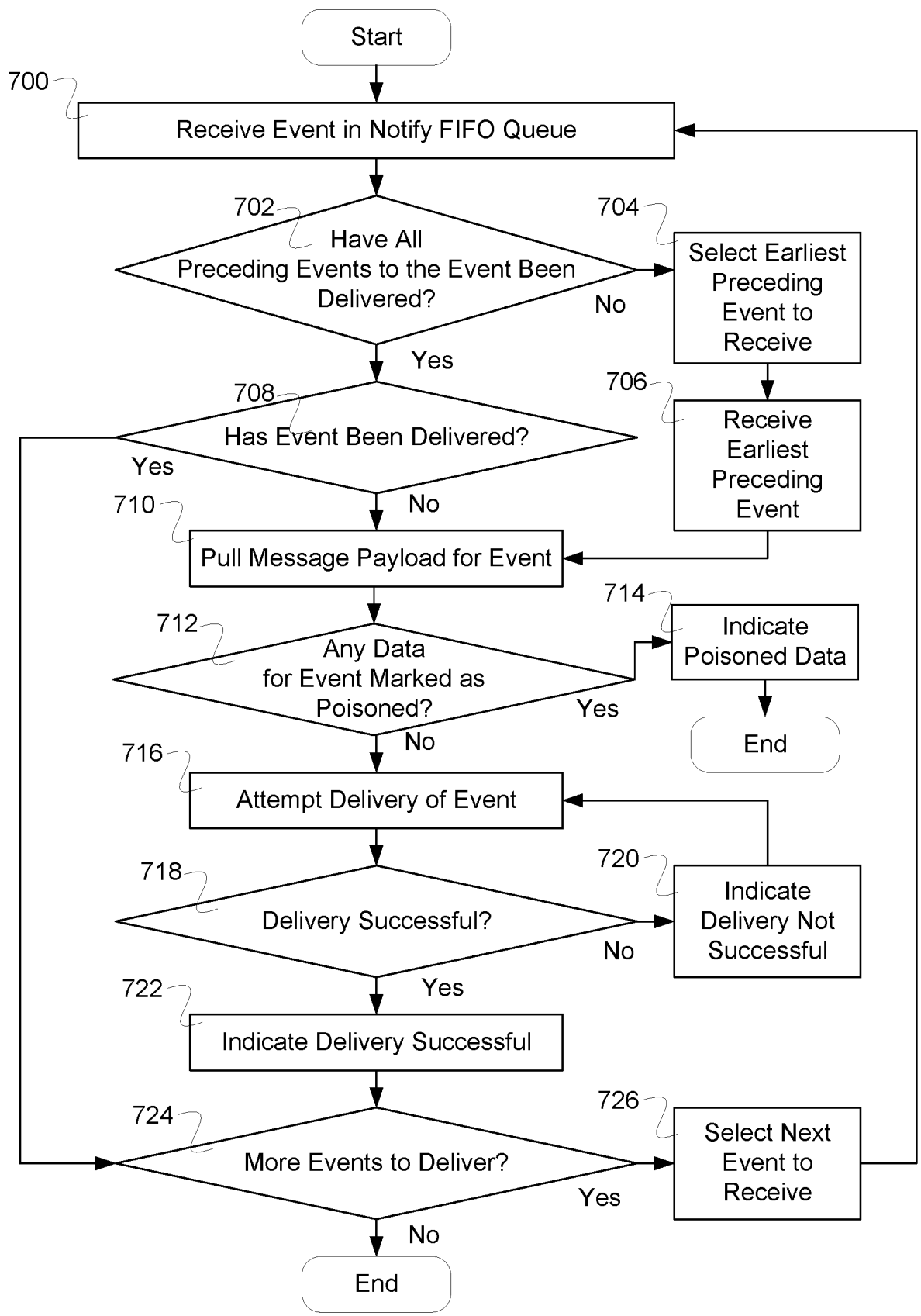
FIG. 7 is a flow diagram illustrating an embodiment of a process for delivering an event in a notify queue.

FIG. 7 is a flow diagram illustrating an embodiment of a process for delivering an event in a notify queue. In some embodiments, the process of FIG. 7 is used to implement 608 of FIG. 6. In the example shown, in 700 an event is received in a notify FIFO queue. For example, the event trigger has created a fetching of the event metadata and this has placed an entry in a notify queue associated with a message group of the event. In 702, it is determined whether all preceding events to the event have been delivered. In response to determining that not all preceding events to the event had been delivered, in 704 the earliest preceding event is selected to be received. For example, an earliest undelivered event in the queue is selected to be received. In 706, the earliest preceding event is received, and control passes to 710. In response to determining in 702 that all preceding events to the even have been delivered control passes to 708. In 708, it is determined whether the event has been delivered. For example, it is determined whether the event has been previously queued and delivered. In response to the event having been delivered, control passes to 720. In response to the event not having been delivered, control passes to 710. In 710 the message payload for the event is pulled. For example, the message payload is pulled from storage (e.g., message broker storage or message consumer local storage). In 712, it is determined whether any data for the event is marked as poisoned. For example, for each data associated with the event, it is determined whether the data is marked or tagged as poisoned or corrupted. In response to determining that a data for the event is marked as poisoned, in 714 poisoned data is indicated and the process ends. For example, the processing for the event ends (e.g., there is no delivery for the event) and it is indicated that poisoned data has been identified associated with the event. In response to not any data for the event being marked as poisoned, in 716 an attempt is made to deliver event. In 718, it is determined whether delivery is successful. In response to delivery not being successful, in 720 it is indicated that delivery is not successful and control passes to 716. In response to delivery being successful, in 722, it is indicated that delivery was successful and control passes to 724. In 724, it is determined whether there are more events to deliver. In response to there being more events to deliver, in 726 a next event is selected to be received and control passes to 700. In response to there not being more events to deliver, the process ends.

Figure 8:
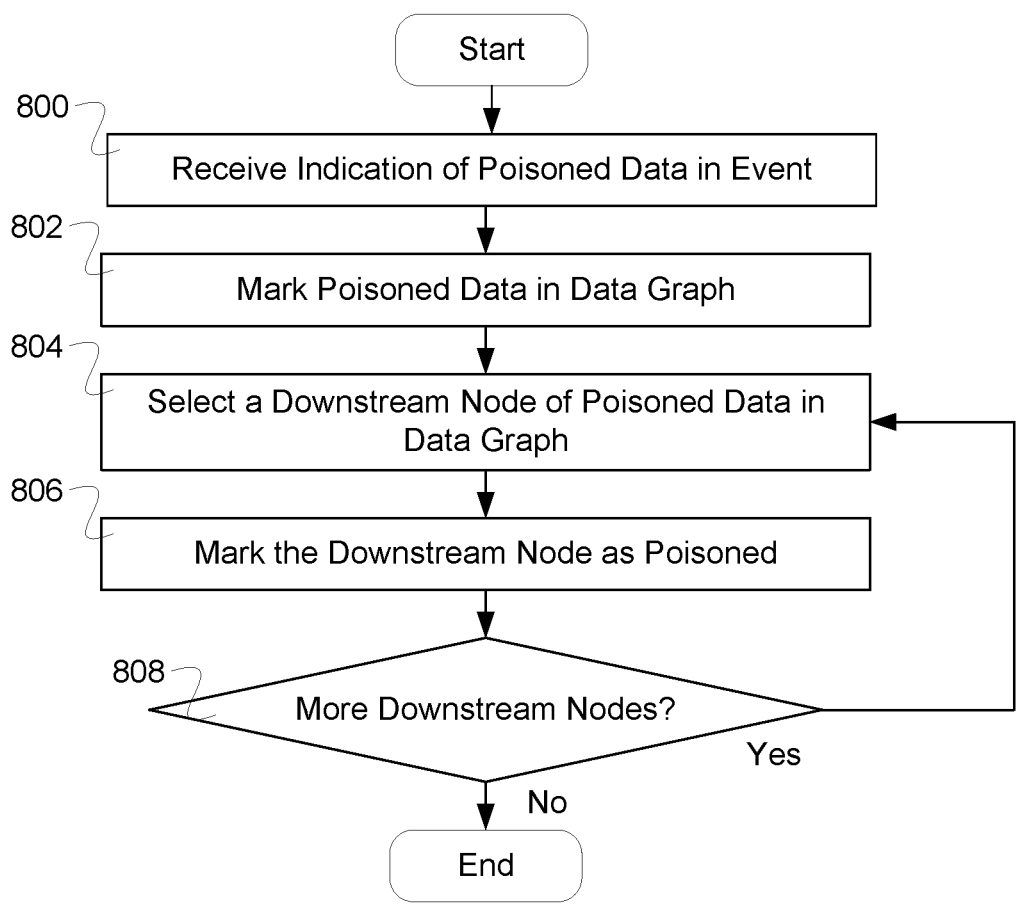
FIG. 8 is a flow diagram illustrating an embodiment of a process for marking data as poisoned.

FIG. 8 is a flow diagram illustrating an embodiment of a process for marking data as poisoned. In some embodiments, the process of FIG. 8 is executed using processor 208 of FIG. 2. In the example shown, in 800 an indication is received of poisoned data in an event. For example, a user or automated process identifies that data of a prior event received in the system was poisoned or corrupted. In 802, poisoned data is marked in data graph. For example, the data graph stored in message broker is accessed and marked based on the indication as to the poisoned data of the event. In 804, a downstream node of the poisoned data in the data graph is selected. For example, data that is downstream in the data graph, in other words data that is sourced from the poisoned data is selected. In 806, the selected downstream node is marked as poisoned. For example, the downstream data in the data graph node is marked as poisoned. In 808, it is determined whether there are more downstream nodes. For example, it is determined whether there are more nodes that need to be marked as poisoned that are downstream in the sourcing data graph. In response to determining that there are more downstream nodes, control passes to 804. In response to determining that there are not more downstream nodes, the process ends.

Figure 9:
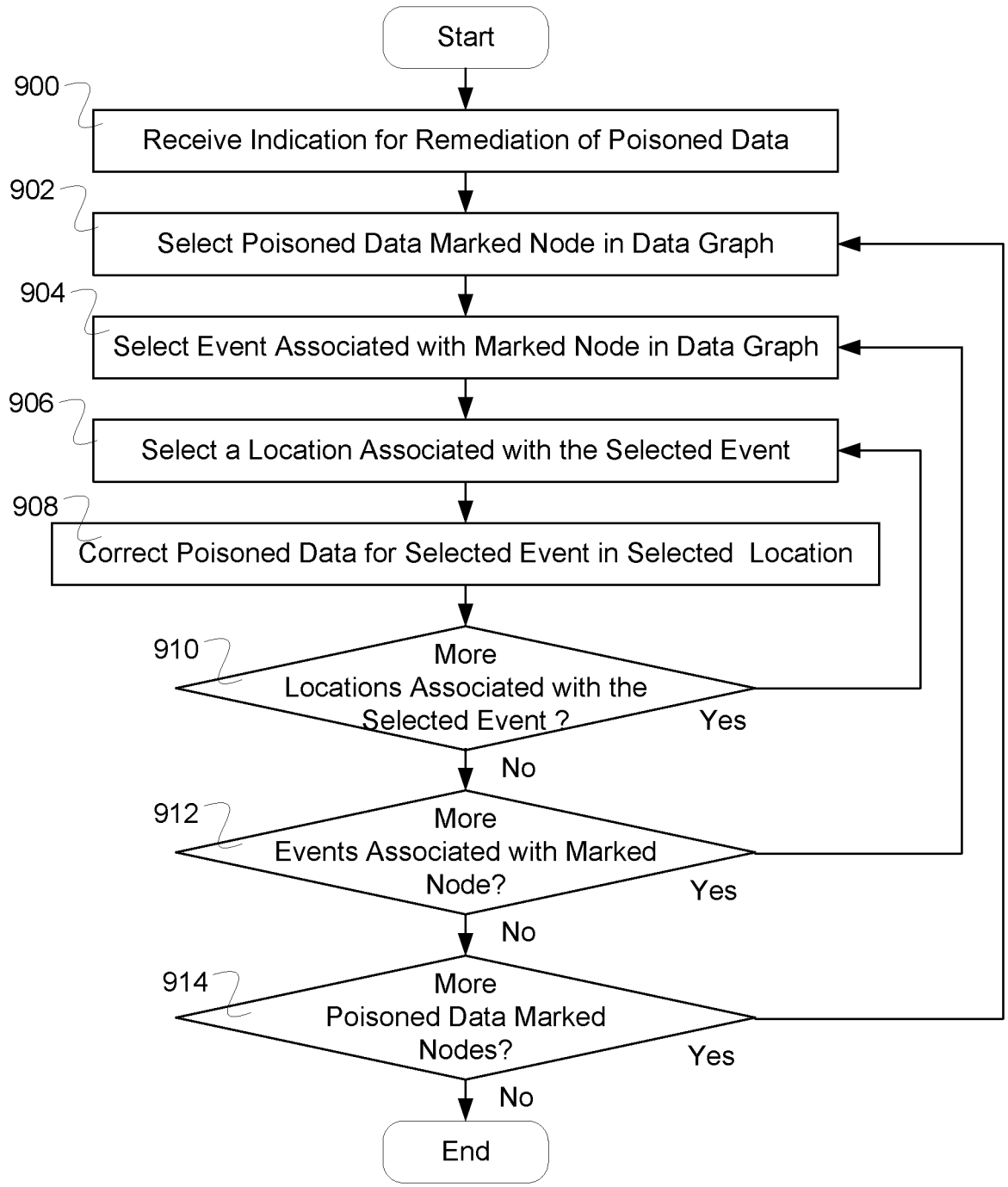
FIG. 9 is a flow diagram illustrating an embodiment of a process for remediating poisoned data.

FIG. 9 is a flow diagram illustrating an embodiment of a process for remediating poisoned data. In some embodiments, the process of FIG. 9 is executed using processor 208 of FIG. 2. In the example shown, in 900 an indication is received for remediation of poisoned data. For example, a corrected version of an indicated poisoned data is received at an interface to the system, which indicates to remediate poisoned data. In 902, a poisoned data marked node is selected in the data graph. In 904, an event associated with the marked node is selected data graph. In 906, a location associated with the selected event is selected. In 908, the poisoned data for the selected event in the selected location is corrected. For example, the poisoned data is remediated using the received indicated correction for the poisoned data, where the poisoned data is associated with an event and is stored in a storage location (e.g., in a service storage location, in a message broker storage location, in a message consumer storage location, etc.). In some embodiments, the storage location is determined based at least in part on a data graph associated with the poisoned data, where the data graph is determined based at least in part on data sourcing information of a published event associated with the poisoned data. In 910, it is determined whether there are more locations associated with the selected event. In response to there being more locations associated with the selected event, control passes to 906. In response to there not being more locations associated with the selected event, control passes to 912. In 912, it is determined whether there are more events associated with the marked node. In response to there being more events associated with the marked node, control passes to 904. In response to there not being more events associated with the marked node, control passes to 914. In 914, it is determined whether there are more poisoned data marked nodes. For example, it is determined whether there are more nodes that are marked as poisoned for the data that is indicated for remediation. In response to there being more poisoned data marked nodes, control passes to 902. In response to there not being more poisoned data marked nodes, the process ends.

In some embodiments, the data sourcing information is received with receiving the published event. In some embodiments, the data graph tracks sourcing relations for data of the published event. In some embodiments, the data graph is stored (e.g., in a message broker storage). In some embodiments, the poisoned data is marked in the data graph. In some embodiments, a downstream node of the poisoned data is marked in the data graph. In some embodiments, all downstream nodes of the poisoned data are marked in the data graph.

In some embodiments, the published event is received by a message broker. In some embodiments, a payload of the published event is determined and stored. In some embodiments, a metadata of the published event is determined. In some embodiments, a sequence number is determined associated with the metadata for the published event. In some embodiments, the sequence number is a next sequence number for a message group associated with the published event. In some embodiments, the metadata is stored associated with the sequence number.

In some embodiments, correcting the poisoned data comprises correcting the poisoned data associated with a location receiving the published event. In some embodiments, correcting the poisoned data comprises correcting the poisoned data associated with a data sourced from the poisoned data. In some embodiments, the data sourced from the poisoned data is stored in another location that previously received the data sourced from the poisoned data. In some embodiments, the data graph comprises a directed acyclic graph. In some embodiments, the published event is not sent to a receiving service in response to any data associated with the published event is marked as poisoned data.

FIG. 10 is a code example illustrating an embodiment of a published event. In some embodiments, the published event of FIG. 10 comprises an event published by message publisher 104 or message publisher 102 of FIG. 1. In the example shown, message 1000 shows a message with event type security edited. The message payload shows an asset_type_id of test-asset_type_id; a current_credit_rating with a data structure that includes a rating_source_name, a rating_source_id, a rating_name, a rating_id, a rating_index, an equivalent_id, an equivalent_value, an equivalent_name, and a date; an equity with a data structure that includes a name, a ticker, a cusip, an asin, an issuer_id, a security_designation_id, an industry_id, a local_currency_id, a domicile_id, a security_description, an effective_date, notes, a pricing_factor, and a valuation_factor; a last_modified_timestamp with a data structure that includes utc_timestamp, a wall_timestamp, a timezone, and a utc_offset; a security type of equity; and a unique_id of secmas:security:iXIdSD8oREuzGdJ20zrFNg==.

FIG. 11 is a diagram illustrating an embodiment of metadata and source/input data of an event. In the example shown, metadata 1100 comprises a sequence number for the event, an event type, schema type that is associated with the event type, a message group associated with the event, and data tags associated with the data of the event. For example, data includes item 1, item 2, etc. and each item includes a sourcing tag and a corrupted data tag. The sourcing tag indicates the source of the data (e.g., an input data source identifier) The corrupted data tag indicates whether the data item has been identified as corrupted.

In some embodiments, using the information present on the event, further layers are associated to the event through the sequence number and a composition of other relevant identifiers. In some embodiments, such extra data is created and stored with a reference such that when the event is transmitted, referenced, or otherwise accessed or used to generate new events. In some embodiments, these extra data are not added to the original event but instead stored in an associative way potentially in proximity to the original events associated through the known identifiable information (e.g., in a metadata database).

In some embodiments, some or all of the metadata is published with the immutable event (e.g., provided with event data as a coupled item or as a separate item and/or stored in an event database). In some embodiments, an enhanced copy of that metadata is maintained by the system/process/entity that tracks the data graph (e.g., the metadata copy in a metadata database would be the one that contains corruption tags and would be mutable).

In some embodiments, in the event that a corrupted data tag is added to one of these extra data layers, this would indicate that the data item has been identified as corrupted and all data emitted or associated could easily be looked up through these associations. In some embodiments, the corrupted data tag is set on the original event (e.g., stored with the event data and not in the metadata database) and cascaded to all layers/associations.

In some embodiments, the corrupted data tags are maintained by a separate entity that tracks metadata about a canonical event (e.g., the object body that contains the rest of the attributes such as sequence number, Message Group, Event Type, and derivation info).

In some embodiments, metadata is stored as associative data to the root event not modifying the root event in any way (except may be in the case, when known, to mark it as corrupted when initially created and stored). In some embodiments, any other associations or data that enhance/support/build a map around the relationships between events should not be stored on the original events themselves, but in a separate database.

Figure 12:
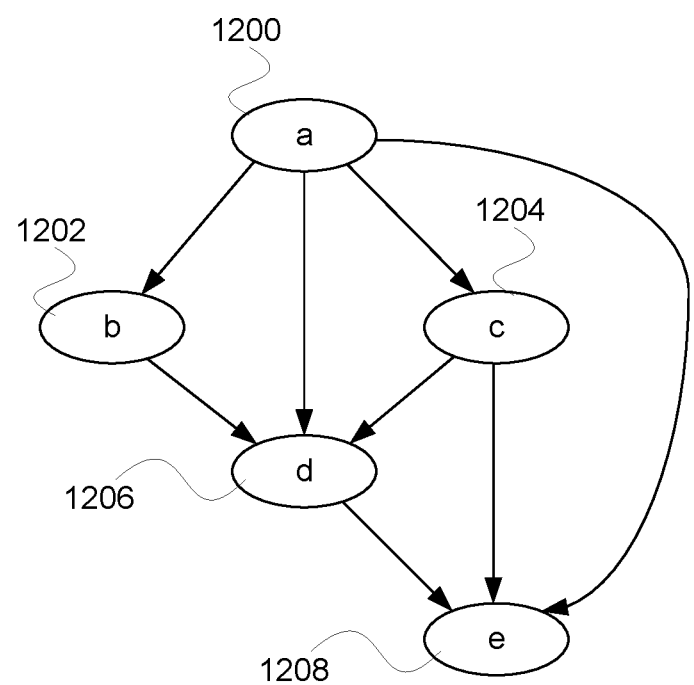
FIG. 12 is a diagram illustrating an embodiment of a data graph.

FIG. 12 is a diagram illustrating an embodiment of a data graph. In some embodiments, the data graph of FIG. 12 is an example of a data graph as stored in data graphs 228 of FIG. 2. In the example shown, node 1200, node 1202, node 1204, node 1206, and node 1208 comprise data received as part of events for a specific piece of data. Node 1202 represents data b that is dependent on the data a of node 1200. So in the event that data a of node 1200 is marked as poisoned, then data b of node 1202, being dependent on a, would also be marked as poisoned. Similarly, data c of node 1204 is dependent on data a of node 1200. Data d of node 1206 is dependent on data b of node 1202, data a of node 1200, and data c of node 1204. Data e of node 1208 is dependent on data d of node 1206, data c of node 1204, and data a of node 1200.

Data when received as part of an event indicates the dependencies as graphed in this example of a data graph. For example, when receiving the data associated with node 1202's event, it is indicated that data b of the event is dependent on data a of node 1200 and its associated event.

In response to a data being indicated as poisoned or corrupted. All downstream nodes are also marked as poisoned. For example, in the event that data c of node 1204 is poisoned, then data d of node 1206 and data e of node 1208 are marked as poisoned as they are downstream of data c of node 1204.

In response to a data being indicated as to be remediated after previously being marked as poisoned. Then the data is corrected and all downstream data is also corrected appropriately. For example, in the event an indication is received that data b of node 1202 and its corresponding event are to be remediated, then data d of node 1206 and data e of node 1208 are also remediated. In some embodiments, the poisoned data has just been transferred and stored and the corrected replacement of data is simply a direct replacement of data. In some embodiments, the poisoned data has been transformed in the downstream data so a computation is required that repeats a previous calculation in order to correct downstream data.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for poisoned data management, comprising:
   an interface configured to receive an indication for remediation of poisoned data;
   a processor configured to:
   correct the poisoned data associated with an event in a storage location, wherein the storage location is determined based at least in part on a data graph associated with the poisoned data, and wherein the data graph is determined based at least in part on the data sourcing information of a published event associated with the poisoned data.

2. The system of claim 1, wherein the data sourcing information is received with receiving the published event.

3. The system of claim 1, wherein the data graph tracks sourcing relations for data of the published event.

4. The system of claim 1, wherein the data graph is stored.

5. The system of claim 1, wherein the poisoned data is marked in the data graph.

6. The system of claim 5, wherein a downstream node of the poisoned data is marked in the data graph.

7. The system of claim 5, wherein all downstream nodes of the poisoned data are marked in the data graph.

8. The system of claim 1, wherein the published event is received by a message broker.

9. The system of claim 8, wherein a payload of the published event is determined and stored.

10. The system of claim 8, wherein a metadata of the published event is determined.

11. The system of claim 10, wherein a sequence number is determined associated with the metadata for the published event.

12. The system of claim 11, wherein the sequence number is a next sequence number for a message group associated with the published event.

13. The system of claim 11, wherein the metadata is stored associated with the sequence number.

14. The system of claim 1, wherein correcting the poisoned data comprises correcting the poisoned data associated with a location receiving the published event.

15. The system of claim 1, wherein correcting the poisoned data comprises correcting the poisoned data associated with a data sourced from the poisoned data.

16. The system of claim 15, wherein the data sourced from the poisoned data is stored in another location that previously received the data sourced from the poisoned data.

17. The system of claim 1, wherein the data graph comprises a directed acyclic graph.

18. The system of claim 1, wherein the published event is not sent to a receiving service in response to any data associated with the published event is marked as poisoned data.

19. A method for poisoned data management, comprising:
   receiving an indication for remediation of poisoned data;
   correcting, using a processor, the poisoned data associated with an event in a storage location, wherein the storage location is determined based at least in part on a data graph associated with the poisoned data, and wherein the data graph is determined based at least in part on the data sourcing information of a published event associated with the poisoned data.

20. A computer program product for poisoned data management embodied in a non-transitory computer readable medium and comprising computer instructions for:
   receiving an indication for remediation of poisoned data;
   correcting the poisoned data associated with an event in a storage location, wherein the storage location is determined based at least in part on a data graph associated with the poisoned data, and wherein the data graph is determined based at least in part on the data sourcing information of a published event associated with the poisoned data.

* * * * *